United States Patent
Bala et al.

(10) Patent No.: US 9,213,701 B2
(45) Date of Patent: Dec. 15, 2015

(54) SYSTEMS AND METHODS FOR ELECTRONICALLY AUTO-FILING AND RETRIEVING REVERSIBLE WRITE ERASEABLE PAPER DOCUMENTS

(75) Inventors: Raja Bala, Pittsford, NY (US); Francis K. Tse, Rochester, NY (US); George Cunha Cardoso, Webster, NY (US); Tonya L. Love, Rochester, NY (US); Fritz F. Ebner, Pittsford, NY (US); Michael R. Furst, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 190 days.

(21) Appl. No.: 13/094,573

(22) Filed: Apr. 26, 2011

(65) Prior Publication Data

US 2012/0274969 A1 Nov. 1, 2012

(51) Int. Cl.
*G06K 15/02* (2006.01)
*G06F 17/30* (2006.01)

(52) U.S. Cl.
CPC .................... *G06F 17/30011* (2013.01)

(58) Field of Classification Search
USPC ................................................. 358/1.14, 2.1
See application file for complete search history.

(56) References Cited

U.S. PATENT DOCUMENTS

| | | | |
|---|---|---|---|
| 2002/0116363 A1* | 8/2002 | Grainger | 707/1 |
| 2003/0053087 A1* | 3/2003 | Sekizawa et al. | 358/1.9 |
| 2004/0182267 A1* | 9/2004 | Suda et al. | 101/453 |
| 2004/0220898 A1* | 11/2004 | Eguchi et al. | G06F 17/30259 1/1 |
| 2005/0219592 A1* | 10/2005 | Toda | 358/1.13 |
| 2006/0218476 A1* | 9/2006 | Gombert | G06Q 10/10 715/205 |
| 2008/0137132 A1* | 6/2008 | Perronnin | G06Q 30/02 358/1.15 |
| 2009/0034997 A1* | 2/2009 | Edwards et al. | 399/45 |
| 2009/0180136 A1* | 7/2009 | Teranishi | G06F 17/30011 358/1.15 |
| 2009/0279125 A1* | 11/2009 | Liu et al. | G06F 3/1205 358/1.15 |
| 2010/0321740 A1* | 12/2010 | Roof | 358/448 |
| 2011/0258177 A1* | 10/2011 | Wu et al. | 707/711 |
| 2011/0310142 A1* | 12/2011 | Xu | B41M 5/00 347/7 |

* cited by examiner

*Primary Examiner* — King Poon
*Assistant Examiner* — Andrew H Lam
(74) *Attorney, Agent, or Firm* — MH2 Technology Law Group LLP

(57) ABSTRACT

An embodiment generally relates to systems and methods for electronically auto-filing and retrieving erasable paper documents documents configured for ultraviolet (UV) imaging. A device can automatically generate an electronic version of the erasable paper document and store the electronic version in a database. A user can search the database for the electronic version with identification information associated with the erasable paper document, upon which the systems and methods can retrieve the electronic version of the erasable paper document for the user. The electronic version of the erasable paper document can be re-rendered either as a new erasable paper document, for display to the user, or other renderings.

18 Claims, 4 Drawing Sheets

SYSTEMS AND METHODS FOR ELECTRONICALLY AUTO-FILING AND RETRIEVING REVERSIBLE WRITE ERASEABLE PAPER DOCUMENTS

FIELD OF THE INVENTION

This invention relates generally to imaging and, more particularly, to electronically auto-filing and retrieving documents printed on erasable paper in an imaging system.

BACKGROUND OF THE INVENTION

Paper documents are often promptly discarded after being read. Although paper is relatively inexpensive, the quantity of discarded paper documents is enormous and the disposal of these discarded paper documents raises significant cost and environmental issues. In addition, it would be desirable that paper documents can be reusable, to minimize cost and environmental issues.

Photochromic paper, also known as erasable paper, provides an imaging medium that can be reused many times to transiently store images and documents. For example, photochromic paper employs photochromic materials to provide an imaging medium for containing desired images. Typically, photochromic materials can undergo reversible or irreversible photoinduced color changes in the photochromic containing imaging layer. In addition, the reversible photoinduced color changes enable image-writing and image-erasure of photochromic paper in sequence on the same paper. For example, an ultraviolet (UV) light source can be used for inducing image-writing, while a combination of heat and a visible light source can be used for inducing image-erasure. An inkless erasable imaging formulation is the subject of U.S. patent application Ser. No. 12/206,136 filed Sep. 8, 2008 and titled "Inkless Reimageable Printing Paper and Method" which is commonly assigned with the present application to Xerox Corp., and is incorporated in its entirety herein by reference. For brevity, in the rest of the disclosure, a document printed on erasable paper can be referred to as an "erasable paper document," and depending on the context, can refer to both the electronic and printed form.

The erasable paper can start to irreversibly fade over time. As such, erasable paper users or customers may not be able to use or see an erasable paper document once it has undergone a certain amount of fading. Further, erasable paper users or customers may be reluctant to use photochromic paper technology for fear that the erasable paper's content may not be recoverable if the erasable paper fades too much. There is no known method to prevent further fading of erasable paper or to bring back contrast to a fading erasable paper document. Therefore, it may be desirable to have systems and methods for retrieving erasable paper documents. Further, it may be desirable to have systems and methods for filing electronic versions of reversible write erasable paper documents for the purpose of re-rendering erasable paper documents that have experienced fading.

SUMMARY

An embodiment generally relates to a method of accessing documents. The method comprises detecting a document to be printed on erasable paper and storing an electronic version of the document. Further, the method comprises receiving, after storing the electronic version of the document, a request to access the electronic version of the document, and retrieving the electronic version of the document in response to receiving the request.

Another embodiment pertains generally to a system for accessing documents. The system comprises a processor coupled to memory and configured to detect a document to be printed on erasable paper and store an electronic version of the document in the memory. Further, the processor is configured to receive a request to access the electronic version of the document and retrieve the electronic version of the document from the memory in response to receiving the request.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
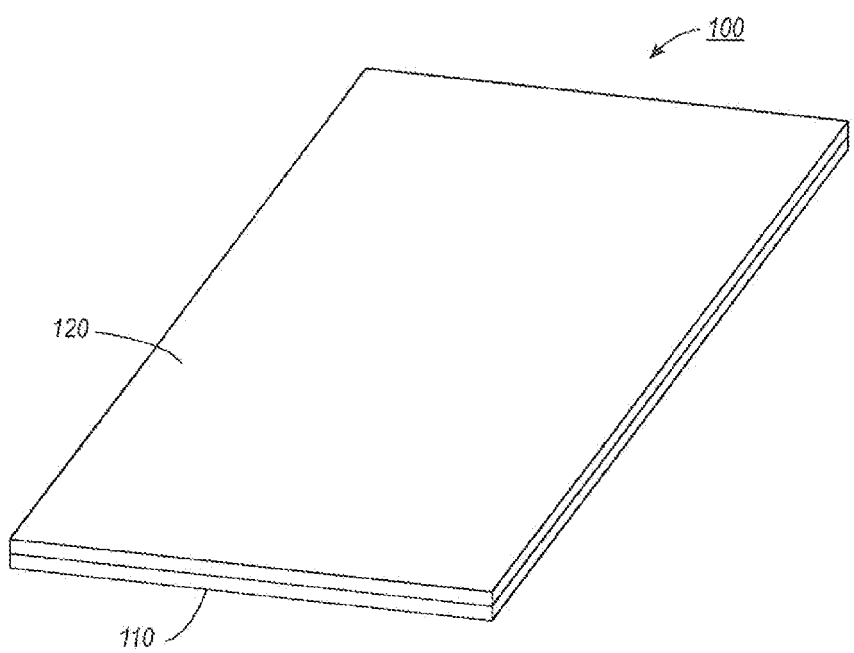
FIG. 1 is a perspective depiction of a transient document page having a photochromic coating which allows for writing an image in the coating on the page and for erasing an image from the coating in accordance with embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

As used herein, the term "erasable paper" refers to a transient or reversible write document that has the appearance and feel of traditional paper, including cardstock and other weights of paper. Erasable paper can be selectively imaged and erased.

As used herein, erasable paper refers to a medium upon which marks are made via an imaging process with the characteristic that the marks fade and ultimately disappear over a period of time. In one embodiment, ultraviolet (UV) imaging is used as the imaging process. Further, an imaged or rendered erasable paper refers to an erasable paper having a visible image thereon, the image a result of, for example, UV imaging the erasable paper. A non-imaged erasable paper refers to an erasable paper that has never been previously imaged, or erasable paper having an image erased therefrom and available for subsequent imaging. An exemplary erasable paper is described in connection with FIG. 1 below.

As used herein, the term "non-erasable" refers to a traditional medium of the type used in any conventional imaging such as ink jet, xerography, or liquid ink electrophotography, as known in the art. An example of a traditional medium can be paper.

As used herein, the term "medium" can include paper, substrate, or similar medium suitable for one or more of erasable paper imaging or conventional imaging.

Embodiments generally relate to systems and methods for electronically auto-filing and retrieving imaged erasable paper documents. More particularly, a retrieval module or other logic can store electronic versions of erasable paper documents in a database, memory, or other forms of storage. In embodiments, a user can retrieve the electronic versions from the storage via browsing, viewing, searching, and other techniques.

FIG. 1 depicts an exemplary erasable medium 100 in accordance with embodiments. It should be readily apparent to one of ordinary skill in the art that the erasable medium 100 depicted in FIG. 1 represents a generalized schematic illustration and that other layers or materials can be added or existing layers or materials can be removed or modified.

As shown in FIG. 1, the erasable medium 100 can comprise a substrate 110 and a photochromic material 120 incorporated into or onto the substrate 110. The photochromic material 120 can provide a reversible writing erasable image-forming formulation on the substrate 110.

The substrate 110 can include, for example, any suitable material such as paper, glass, ceramic, wood, plastics, fabrics, textile products, polymeric films, inorganic substrates such as metals, and the like. The paper can include, for example, plain papers such as XEROX® 4024 papers, ruled notebook paper, bond paper, and silica coated papers such as Sharp Company silica coated paper, Jujo paper, and the like. The substrate 110, such as a sheet of paper, can have a blank appearance.

In various embodiments, the substrate 110 can be made of a flexible material and can be transparent or opaque. The substrate 110 can be a single layer or multi-layer where each layer is the same or different material and can have a thickness, for example, ranging from about 0.05 mm to about 5 mm.

The photochromic material 120 can be impregnated, embedded or coated to the substrate 110, for example, a porous substrate such as paper. In various embodiments, the photochromic material 120 can be applied uniformly to the substrate 110 and/or fused or otherwise permanently affixed thereto.

Images formed in/on an erasable medium can be selectively or locally erased. In order to effect the transition from a visible image to an erased medium, radiant energy and/or heat can be applied to the imaged erasable medium at a temperature suitable for effecting the erasure. In embodiments, the temperature suitable for effecting the erasure can be, for example, above about 70° C., such as from about 80° C. to about 200° C. In an exemplary embodiment, the imaged erasable medium can be completely erased, for example, at about 160° C. or higher.

In embodiments, in order to image an original erasable medium or re-image the erased erasable medium, the erasable medium can be pre-heated to a temperature of about 55° C. or higher before writing, for example, using a radiant energy such as a UV exposure.

It will be appreciated that other types of erasable media, other than photochromic media, can be used in connection with the exemplary embodiments herein. Such types of erasable media are intended to be included within the scope of the disclosure.

In embodiments, the photochromic material 120 can include, for example, an inkless erasable imaging formulation as described in U.S. patent application Ser. No. 12/206,136 filed Sep. 8, 2008 and entitled "Inkless Reimageable Printing Paper and Method," which is commonly assigned with the present application to Xerox Corp., and is incorporated in its entirety herein by reference.

Figure 2:
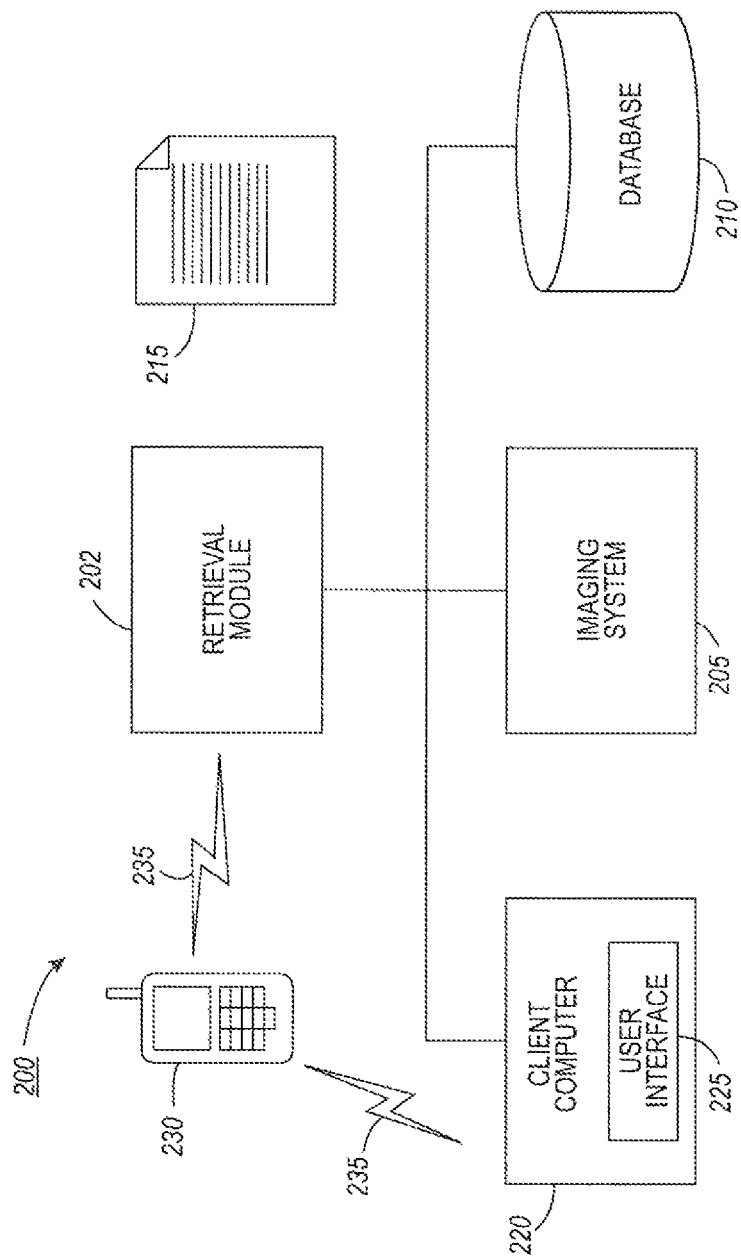
FIG. 2 illustrates an exemplary system for storing and retrieving erasable paper documents in accordance with another embodiment.

FIG. 2 illustrates an exemplary system 200 of electronically auto-filing and retrieving erasable paper documents, according to embodiments. It should be appreciated that the system 200 as depicted in FIG. 2 is merely exemplary and other components and arrangements thereof are envisioned.

The system 200 can comprise a retrieval module 202, an imaging system 205, and a database 210. The retrieval module 202 can interface with the imaging system 205 and the database 210 and can comprise any processing, application, and/or memory capabilities for directing the operation of or carrying out the embodiments as described herein. In some embodiments, the retrieval module 202 can be incorporated into or separate from the imaging system 205. In some embodiments, the imaging system 205 can comprise multiple imaging devices, can be capable of imaging or printing erasable paper documents, such as erasable paper document 215, can be a standard imaging device, or can be a combination thereof.

According to embodiments, the retrieval module 202 can directly transmit or direct the imaging system 205 or other resources to transmit an electronic version of the erasable paper document 215 to the database 210 for storage. In embodiments, the imaging system 205 can automatically generate an electronic version of the erasable paper document 215 for storage, e-filing, and the like before, during, or after the imaging system 205 renders the erasable paper document 215. For example, a print driver of the imaging system 205 can generate both the electronic version of the erasable paper document 215 and a version of the erasable paper document 215 to be rendered on erasable paper. It should be appreciated that the imaging system 205 can generate an electronic version of the erasable paper document 215 after the erasable paper document 215 is rendered on erasable paper such as, for example, if a user later wants to scan the rendered document.

In embodiments, the electronic version of the erasable paper document 215 can be specified with a "fade duration" over which the electronic version persists in the database 210 or other resources. In some embodiments, the electronic version can be purged from the database 210 upon expiration of the fade duration. In embodiments, the fade duration can be a set amount of time or can be customized by a user, logic, or other entity to be shorter, the same, or longer than the optical fade duration of the erasable paper document 215 itself.

It should be appreciated that the database 210 can be searchable and can be any form of server, memory, database, cloud-based resource, or other storage device or component. In embodiments, the database 210 can be accessible via user accounts associated with online service or cloud-based resources such as, for example, Amazon® S3 Cloud®, Google® Docs, MobileMe® iDisk®, Docushare®, or any other service. In other embodiments, one or more users and/or administrators can specify secure access to the database 210 and other components via the retrieval module 202, the imaging system 205, or desktop, web, or print driver interfaces, or other interfaces.

In embodiments, a user, administrator or other entity can manually search for the electronic version of the erasable paper document 215. For example, a user, administrator, or other entity can input search parameters into a client computer 220 via, for example, a user interface 225. The client computer 220 can interface with the retrieval module 202 to use the inputted search parameters to locate and retrieve the corresponding electronic version of the erasable paper document 215 from the database 210. In embodiments, the client computer 220 can be any computing device or hardware capable of interfacing with the retrieval module 202 or other logic. In some embodiments, the client computer 220 can be incorporated into or separate from the imaging system 205. In other embodiments, a user, administrator, or other entity can use a device 230 such as, for example, a smart phone, personal digital assistant (PDA), tablet device, laptop, or any other device, to connect to the client computer 220, retrieval module 202, or other logic, and to input search parameters for the electronic version of the erasable paper document 215. In embodiments, the device 230 can connect to entities of the system 200 via a network such as a wireless or cellular data network 235, or other networks.

In embodiments, a user, administrator or other entity can use the client computer 220, device 230, user interface 225, a web interface, or other resources or interfaces to browse, view, or search the database 210 via input fields such as, for example, a user ID, time and location of a printing, file type, keywords, document type, document size, document content, or any other semantic content within a document. If a matching electronic version of the erasable paper document 215 is located in the database 210 or another resource, the retrieval module 202 can retrieve the electronic version and provide it to the client computer 220, the device 230, or another component.

The retrieval module 202 or other logic can direct the imaging system 205 or other resources to re-render the electronic version of the erasable paper document 215. In embodiments, the imaging system 205 can use the electronic version to image a new copy of the erasable paper document 215 either as another erasable paper document or as a standard document. In embodiments, the retrieval module 202 can retrieve and/or render the whole or a partial amount of the electronic version of the erasable paper document 215. In other embodiments, the retrieval module 202 can transmit the electronic version of the erasable paper document 215 to the client computer 220 or the device 230, or other resources, for virtual viewing on, for example, the user interface 225 or a display screen of the device 230. Upon viewing the electronic version of the erasable paper document 215, a user, administrator, or other entity of the client computer 220, the device 230, or other resource can select to render the erasable paper document 215 by, for example, imaging a new copy of the erasable paper document 215 on the imaging system 205. In embodiments, a user, administrator, or other entity can specify to have the electronic version of the erasable paper document 215 converted into an editable format compatible with word processing applications, or other formats.

In embodiments, the erasable paper document 215 can be rendered by incorporating value-added information into the electronic version or a new copy of the erasable paper document 215. For example, the retrieval module 202 or other logic can add personalized or content-based advertising, or other information, to the erasable paper document 215. In embodiments, the electronic version of the erasable paper document 215 can comprise information about how the original erasable paper document 215 was imaged so that an exact replication of the erasable paper document 215 can be rendered.

Figure 3:
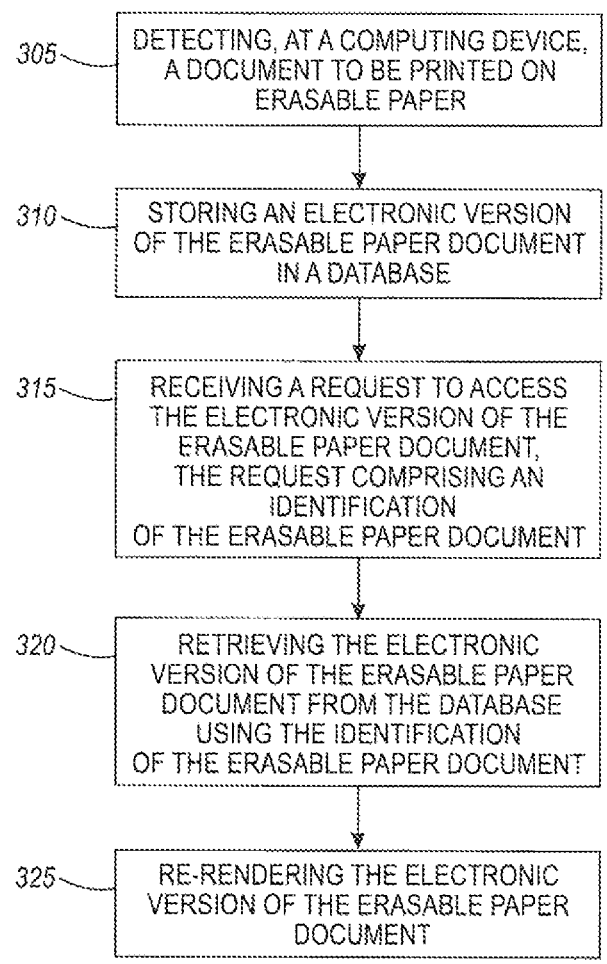
FIG. 3 illustrates an exemplary flow diagram of accessing erasable paper documents in accordance with embodiments.

FIG. 3 illustrates an exemplary flow diagram 300 implemented by systems and methods in accordance with embodiments. It should be readily apparent to those of ordinary skill in the art that the flow diagram 300 depicted in FIG. 3 represents a generalized illustration and that other steps can be added or existing steps can be removed or modified.

In 305, a document to be printed on erasable paper can be detected at a computing device such as a client computer, or other devices. In embodiments, the erasable paper document can be received at a print driver in preparation for imaging, at a scanning device, or via other detection mechanisms. In 310, an electronic version of the erasable paper document can be stored or filed in a database. In embodiments, the database can be a searchable database, and can be implemented as local, cloud-based, or other forms of storage. In further embodiments, a user associated with the erasable paper document can set up a secure account when storing the electronic version of the erasable paper document. In embodiments, the secure account can aid in locating and retrieving the erasable paper document from the database, and allow the user to store multiple erasable paper documents in the database.

In 315, a request to access the electronic version of the erasable paper document can be received. In embodiments, the request can comprise an identification of the erasable paper document such as, for example, secure account information, time, location, file type, keywords, and other semantic content of the erasable paper document. In other embodiments, the request can be received via a desktop, print-driver, web interface, mobile device, or other mechanisms. In 320, the electronic version of the erasable paper document can be retrieved from the database using the identification of the erasable paper document. In embodiments, a database search can be performed with the identification of the erasable paper document as an input. In other embodiments, the electronic version of the erasable paper document can be provided to a user via a desktop interface, web interface, mobile interface, or the like, or can be sent directly to a print driver.

In 325, the electronic version of the erasable paper document can be re-rendered. In embodiments, the re-rendering can comprise imaging the electronic version to a hardcopy medium (e.g. an erasable paper or standard imaging device), an electronic or web portal, a viewing device, or other rendering vehicles. In other embodiments, the re-rendering can comprise incorporating information into the re-rendered version, such as personalized information, content-based pop-up advertisements, and other information. In further embodiments, the electronic version of the erasable paper document can be converted to an editable format compatible with a word processing application.

Figure 4:
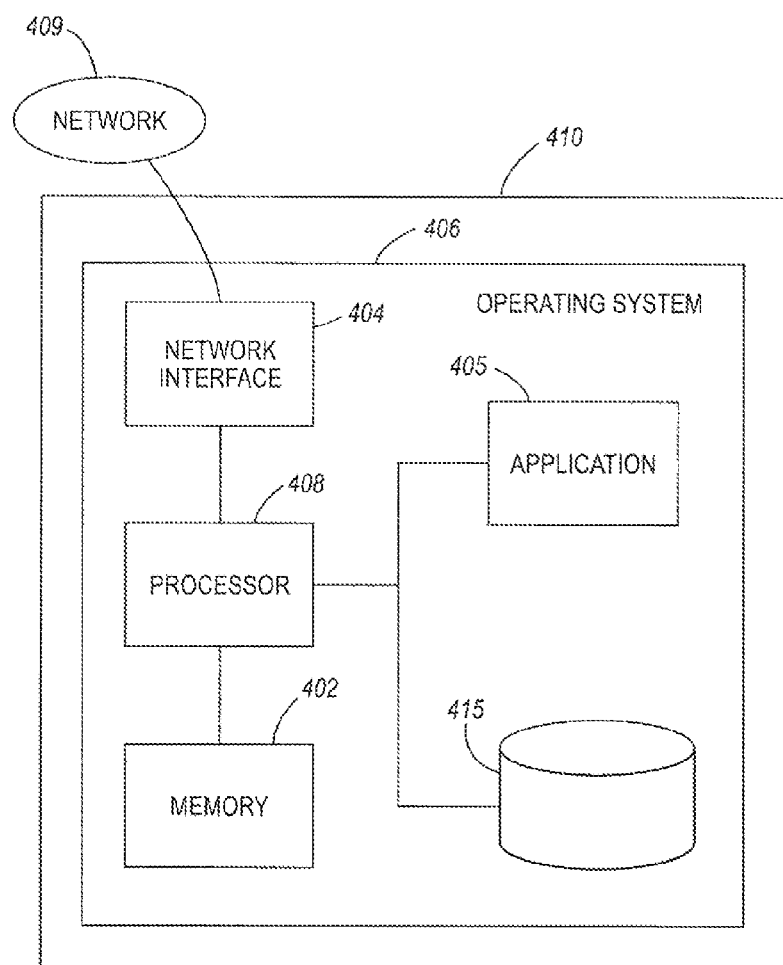
FIG. 4 illustrates a hardware diagram in accordance with another embodiment.

FIG. 4 illustrates an exemplary diagram of hardware and other resources that can be incorporated with processing and logic associated with the present embodiments. As shown in FIG. 4, a server 410 can be configured to communicate with a network 409. In embodiments as shown, the server 410 can comprise a processor 408 communicating with memory 402, such as electronic random access memory, or other forms of transitory or non-transitory computer readable storage mediums, operating under control of or in conjunction with an operating system 406. The operating system 406 can be any commercial, open-source, or proprietary operating system or platform. The processor 408 can communicate with a database 415, such as a database stored on a local hard drive. While illustrated as a local database in the server 410, the database 415 can be separate from the server 410.

The processor 408 can further communicate with a network interface 404, such as an Ethernet or wireless data connection, which in turn communicates with the network 409, such as the Internet or other public or private networks. The processor 408 can also communicate with the database 415 or any applications 405, such as applications associated with the retrieval module 202, to execute control logic and perform the generation and e-filing of electronic versions of erasable paper documents, as described herein.

While FIG. 4 illustrates the server 410 as a standalone system comprising a combination of hardware and software, the server 410 can also be implemented as a software application or program capable of being executed by a conventional computer platform. For example, it should be understood that the components of the server 410 can be implemented on user PCs or other hardware such that the user PCs can communicate directly with the database 415. Likewise, the server 410 can also be implemented as a software module or program module capable of being incorporated in other software applications and programs. In either case, the server 410 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing documents, the method comprising:
   receiving a document to be printed on erasable paper at a print driver;
   determining an expected optical fade duration of the erasable paper;
   printing the document on erasable paper by applying original printing parameter information indicating how the document is to be printed;
   automatically generating, by a processor, an electronic version of the document for storage in a searchable database in response to receiving the document to be printed on the erasable paper at the print driver, wherein the electronic version of the document comprises the original printing parameter information;
   storing the electronic version of the document and the expected optical fade duration;
   receiving, after storing the electronic version of the document, a request to access the electronic version of the document;
   retrieving the electronic version of the document in response to receiving the request;
   re-rendering the electronic version of the document using the original printing parameter information associated with the document to be printed, such that an exact replication of the document to be printed is generated;
   setting an electronic version fade duration that is greater than the expected optical fade duration; and
   purging the electronic version of the document from the searchable database after an amount of time equal to the electronic version fade duration.

2. The method of claim 1, wherein the document is printed on the erasable paper using ultraviolet (UV) imaging.

3. The method of claim 1, wherein receiving the document to be printed on the erasable paper at the print driver comprises receiving a job ticket indicating that a printing device to which the document is sent is configured to print on erasable paper.

4. The method of claim 1, wherein storing the electronic version of the document comprises filing the electronic version of the document in the searchable database.

5. The method of claim 4, wherein the searchable database is at least one of an Amazon® S3 Cloud® database, a Google® Docs database, a MobileMe® iDisk® database, and a Docushare® database.

6. The method of claim 1, wherein the request comprises an identification of the document, and wherein retrieving the electronic version of the document comprises searching a searchable database with the identification.

7. The method of claim 1, wherein setting the electronic version fade duration based on the expected optical fade duration comprises customizing the electronic version fade duration based on input from a user.

8. The method of claim 1, further comprising:
receiving instructions from a user to convert the electronic version of the document into an editable format; and
converting the electronic version of the document into the editable format based on the instructions.

9. The method of claim 1, wherein re-rendering the electronic version of the document comprises incorporating at least one of personalized content and advertising content to the exact replication of the document to be printed.

10. A system for accessing documents, the system comprising:
a processor coupled to memory and configured to perform actions comprising:
receiving a document to be printed on erasable paper at a print driver;
determining an expected optical fade duration of the erasable paper;
printing the document on erasable paper by applying original printing parameter information indicating how the document is to be printed;
automatically generating, by a processor, an electronic version of the document for storage in a searchable database in response to receiving the document to be printed on the erasable paper at the print driver, wherein the electronic version of the document comprises the original printing parameter information;
storing the electronic version of the document and the expected optical fade duration;
receiving, after storing the electronic version of the document, a request to access the electronic version of the document;
retrieving the electronic version of the document in response to receiving the request;
re-rendering the electronic version of the document using the original printing parameter information associated with the document to be printed, such that an exact replication of the document to be printed is generated;
setting an electronic version fade duration that is greater than the expected optical fade duration; and
purging the electronic version of the document from the searchable database after an amount of time equal to the electronic version fade duration.

11. The system of claim 10, wherein the document is printed on the erasable paper using ultraviolet (UV) imaging.

12. The system of claim 10, wherein receiving the document to be printed on the erasable paper at the print driver comprises receiving a job ticket indicating that a printing device to which the document is sent is configured to print on erasable paper.

13. The system of claim 10, wherein storing the electronic version of the document comprises filing the electronic version of the document in the searchable database.

14. The system of claim 13, wherein the searchable database is at least one of an Amazon® S3 Cloud® database, a Google® Docs database, a MobileMe® iDisk® database, and a Docushare® database.

15. The system of claim 10, wherein the request comprises an identification of the document, and wherein retrieving the electronic version of the document comprises searching a searchable database with the identification.

16. The system of claim 10, wherein setting the electronic version fade duration based on the expected optical fade duration comprise customizing the electronic version fade duration based on input from a user.

17. The system of claim 10, wherein the processor is further configured to:
receive instructions from a user to convert the electronic version of the document into an editable format; and
convert the electronic version of the document into the editable format based on the instructions.

18. The system of claim 10, wherein re-rendering the electronic version of the document comprises incorporating at least one of personalized content and advertising content to the exact replication of the document to be printed.

* * * * *